(12) United States Patent
Wilker et al.

(10) Patent No.: US 11,046,873 B2
(45) Date of Patent: Jun. 29, 2021

(54) METHODS OF ADHERING IN AN AQUEOUS ENVIRONMENT

(71) Applicant: Purdue Research Foundation, West Lafayette, IN (US)

(72) Inventors: Jonathan James Wilker, Lafayette, IN (US); Michael A. North, Lafayette, IN (US); Chelsey A. Del Grosso, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 122 days.

(21) Appl. No.: 16/327,382

(22) PCT Filed: Aug. 21, 2017

(86) PCT No.: PCT/US2017/047769
§ 371 (c)(1),
(2) Date: Feb. 22, 2019

(87) PCT Pub. No.: WO2018/089078
PCT Pub. Date: May 17, 2018

(65) Prior Publication Data
US 2019/0322910 A1    Oct. 24, 2019

Related U.S. Application Data

(60) Provisional application No. 62/377,842, filed on Aug. 22, 2016.

(51) Int. Cl.
*C09J 125/08*    (2006.01)
*C09J 5/04*    (2006.01)

(52) U.S. Cl.
CPC ............... *C09J 125/08* (2013.01); *C09J 5/04* (2013.01); *C09J 2301/414* (2020.08); *C09J 2400/163* (2013.01); *C09J 2400/303* (2013.01); *C09J 2425/00* (2013.01); *C09J 2427/006* (2013.01)

(58) Field of Classification Search
CPC ...... C09J 125/08; C09J 5/04; C09J 2301/414; C09J 2400/163; C09J 2400/303; C09J 2425/00; C09J 2427/006; C09J 125/18; C09J 2400/226; C08F 2810/50; C08F 212/24; C08F 8/12; C08F 212/08
See application file for complete search history.

(56) References Cited

U.S. PATENT DOCUMENTS

2009/0036611 A1* 2/2009 Wilker .................. C08F 212/08
525/328.5
2014/0311673 A1 10/2014 Zhao

FOREIGN PATENT DOCUMENTS

WO    WO2007127225 A2    11/2017

OTHER PUBLICATIONS

White, Macromolecules, 2011, vol. 44, p. 5085-5088 and supporting information, p. S1-S10 (Year: 2011).*

(Continued)

*Primary Examiner* — Robert C Boyle
(74) *Attorney, Agent, or Firm* — Purdue Research Foundation; Liang Zeng Yan (57) ABSTRACT

Embodiments of this invention relate to methods of adhering in an aqueous environment. More specifically, embodiments of this invention relate to use of a copolymer mimics of mussel adhesive proteins as a high-strength adhesive in aqueous environments.

19 Claims, 3 Drawing Sheets

(56) References Cited

OTHER PUBLICATIONS

Matos-Perez, J. Am. Chem. Soc. 2012, vol. 134, p. 9498-9505 (Year: 2012).*
Jenkins, ACS Appl. Mater. Interfaces 2013, 5, p. 5091-5096 (Year: 2013).*
White, et al. "Underwater bonding with charged polymer mimics of marine mussel adhesive proteins." Macromolecules, 2011, 44(13), 5085-5088.
Jenkins, et al. "Integrating mussel chemistry into a bio-based polymer to create degradable adhesives." Macromolecules, 2017, 50, 561-568.
PCT, International search report and the written opinion. ISRWO_PCTUS1747769 dated 2018.
North, et al. "High Strength Underwater Bonding with Polymer Mimics of Mussel Adhesive Proteins." ACS Applied Materials and Interfaces 2017, 9, 7866-7872.

* cited by examiner

METHODS OF ADHERING IN AN AQUEOUS ENVIRONMENT

CROSS-REFERENCE TO RELATED APPLICATIONS

The present U.S. patent application is related to and claims the priority benefit of U.S. Provisional Patent Application Ser. No. 62/377,842, filed Aug. 22, 2016, the contents of which are hereby incorporated by reference in their entirety into this disclosure.

STATEMENT OF GOVERNMENT INTEREST

This invention was made with government support under grant numbers: N000141010105, N000141310327 and N000140611164 awarded by the Office of Naval Research. The United States government has certain rights in the invention.

TECHNICAL FIELD

The present disclosure generally relates to methods of adhering in an aqueous environment, and in particular to use of polymer mimics of mussel adhesive proteins as high-strength adhesives in aqueous environments.

BACKGROUND

This section introduces aspects that may help facilitate a better understanding of the disclosure. Accordingly, these statements are to be read in this light and are not to be understood as admissions about what is or is not prior art.

Adhesives with different chemistries and varying forms have found widespread use in the automotive, aerospace, construction, and biomedical industries. The polymers most often used in adhesives are epoxy, polyurethane, or acrylics. Underwater adhesion presents several technical challenges. When applied to submerged substrates, an adhesive will often interact with water prior to forming adhesive bonds with the substrates or cohesive bonds within the bulk of the adhesive.

Although man-made adhesives typically do not work well underwater, marine organisms such as oysters, barnacles, sea grasses, and tube worms, have developed effective adhesives for aqueous environments. The common blue mussel (*Mytilus edulis*) attaches to substrates upon depositing a mixture of proteins containing an atypical amino acid, 3,4-dihydroxyphenylalanine (DOPA). Cross-linking of these proteins generates cured adhesive.

However, it is not understood how mussel adhesive proteins are so effective in aqueous environments which are unfavorable for adhesion. In particular, mussel adhesive proteins vary widely with DOPA content ranging from about 3% to about 30% of total amino acid content, as measured by number of amino acid residues, and molecular weights ranging from about 6,000 grams/mole to about 110,000 grams/mole. It is unclear how such disparate mussel adhesive proteins remain effective at bonding (Q. Lin, et al., *Proc. Natl. Acad. Sci.* 2007, 104, 3782-3786).

In recent years there has been a blossoming of material systems that mimic various aspects of mussel adhesive proteins (A. Hagenau, et al., *Prog. Polym. Sci.*, 2014, 39, 1564-1583; S. Moulay, *Polym. Rev.* 2014, 54, 436-513). Synthetic biomimetic polymers substitute for the protein backbone and derivatives of catechol are appended to these chains in attempts to mimic the cross-linking and adhesion chemistry of DOPA (H. J. Meredith, et al., *Adv. Funct. Mater.* 2014, 24, 3259-3267). Biomimetic polymers designed to mimic mussel adhesive proteins have produced dry bonding strengths exceeding those of long established commercial adhesive products. In particular, prior studies have shown that poly[(3,4-dihydroxystyrene)-co-styrene] ("catechol-polystyrene") is a useful mimic of mussel adhesive proteins in terms of dry bonding performance. Catechol groups pendant from a polystyrene backbone mimic, respectively, the DOPA and polypeptide chains of mussel adhesive proteins (C. R. Matos-Perez, et al., *J. Am. Chem. Soc.* 2012, 134, 9498-9505; H. J. Meredith, et al., *Adv. Funct. Mater.* 2014, 24, 3259-3267). Dry bonding strength was determined to be well into the megapascal (MPa) range for lap shear joints between metal, plastic, and wood substrates (ibid.). However, the effectiveness of an adhesive in dry bonding does not directly correlate with the effectiveness of the adhesive in bonding in an aqueous environment. A need exists for a high-strength, man-made adhesive and method of adhering effective in an aqueous environment that preferably rivals or exceeds the bond strength of mussel adhesive proteins.

SUMMARY

Disclosed herein are methods of adhering in an aqueous environment. In some embodiments, a method of adhering in an aqueous environment comprises selecting at least two substrates to be adhered, adhering the substrates using a copolymer adhesive prepared from polymerization of a substituted styrene and an unsubstituted styrene, and subjecting the adhered substrates to an aqueous environment. In certain embodiments, the copolymer adhesive is poly[(3,4-dihydroxystyrene)-co-styrene].

Macroscale adhesion relies upon achieving a balance between surface attachment and cohesive bonding within the bulk of the adhesive. Dry bonding adhesion has been substantially optimized for the catechol-polymer discussed herein. However, the presence of water in an aqueous environment raises further difficulties. Here, it was discovered that increasing surface attachment at the expense of cohesive bonding results in an adhesive with improved bonding characteristics in an aqueous environment. Such improved aqueous characteristics are achievable by decreasing the catechol content, which decreases the cohesive bonding but also decreases the molecular weight, which improves surface attachment. Without being bound by theory, it is hypothesized that the potential chemical interactions between the adhesive and water—which are not present in dry bonding—increases the importance of intra-adhesive surface attachment relative to dry bonding and results in an optimized wet bonding adhesive which differs significantly in catechol content and molecular weight from the optimized dry bonding adhesive.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE FIGURES

A better understanding of the present invention will be had upon reference to the following description in conjunction with the accompanying drawings.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 80%, within 90%, within 95%, or within 99% of a stated value or of a stated limit of a range.

Any reference to "invention" within this document herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Specific quantities (spatial dimensions, pressures, momenta, dimensionless parameters, etc.) may be used explicitly or implicitly herein, such specific quantities are presented as examples and are approximate values unless otherwise indicated. Discussions pertaining to specific compositions of matter are presented as examples and do not limit the applicability of other compositions of matter, especially other compositions of matter with similar properties, unless otherwise indicated.

Disclosed herein are methods of adhering in an aqueous environment. In some embodiments, a method of adhering in an aqueous environment comprises selecting at least two substrates to be adhered, adhering the substrates using a copolymer adhesive prepared from polymerization of a substituted styrene and an unsubstituted styrene, and subjecting the adhered substrates to an aqueous environment. In certain embodiments, the copolymer adhesive is poly[(3,4-dihydroxystyrene)-co-styrene].

Macroscale adhesion relies upon achieving a balance between surface attachment and cohesive bonding within the bulk of the adhesive. Dry bonding adhesion has been substantially optimized for the catechol-polymer discussed herein. However, the presence of water in an aqueous environment raises further difficulties. Here, it was discovered that increasing surface attachment at the expense of cohesive bonding results in an adhesive with improved bonding characteristics in an aqueous environment. Such improved aqueous characteristics are achievable by decreasing the catechol content, which decreases the cohesive bonding but also decreases the molecular weight, which improves surface attachment. Without being bound by theory, it is hypothesized that the potential chemical interactions between the adhesive and water—which are not present in dry bonding—increases the importance of intra-adhesive surface attachment relative to dry bonding and results in an optimized wet bonding adhesive which differs significantly in catechol content and molecular weight from the optimized dry bonding adhesive.

In some illustrative embodiments, the present invention relates to a method of adhering a plurality of substrates in an aqueous environment, comprising the steps of:
  a. selecting at least two substrates to be adhered;
  b. adhering the substrates using a copolymer adhesive prepared from polymerization of a substituted styrene and an unsubstituted styrene; and
  c. subjecting the adhered substrates to an aqueous environment.

In some embodiments, the present invention relates to a method of adhering a plurality of substrates in an aqueous environment, wherein the substituted styrene is a dihydroxystyrene.

In some embodiments, the present invention relates to a method of adhering a plurality of substrates in an aqueous environment, wherein the substituted styrene is a 3,4-dihydroxystyrene.

In some embodiments, the present invention relates to a method of adhering a plurality of substrates in an aqueous environment, wherein the substituted styrene comprise about 1-49% of the copolymer adhesive by molar percentage.

In some preferred embodiments, the present invention relates to a method of adhering a plurality of substrates in an aqueous environment, wherein the substituted styrene comprise about 20-30% of the copolymer adhesive by molar percentage.

In some other embodiments, the present invention relates to a method of adhering a plurality of substrates in an aqueous environment, wherein the substituted styrene comprise less than 25% of the copolymer adhesive by molar percentage.

In some embodiments, the present invention relates to a method of adhering a plurality of substrates in an aqueous environment, wherein the unsubstituted styrene comprise more than 51-99% of the copolymer adhesive by molar percentage.

In some preferred embodiments, the present invention relates to a method of adhering a plurality of substrates in an aqueous environment, wherein the unsubstituted styrene comprise more than 75% of the copolymer adhesive by molar percentage.

In some embodiments, the present invention relates to a method of adhering a plurality of substrates in an aqueous environment, wherein the substrates are subjected to the aqueous environment prior or subsequent to adhering.

In some embodiments, the present invention relates to a method of adhering a plurality of substrates in an aqueous environment, wherein the substrates are subjected to the aqueous environment during adhering.

In some embodiments, the present invention relates to a method of adhering a plurality of substrates in an aqueous environment, wherein the aqueous environment is salt water or fresh water.

In some embodiments, the present invention relates to a method of adhering a plurality of substrates in an aqueous environment, wherein the copolymer adhesive is poly[(3,4-dihydroxystyrene)-co-styrene].

In some other embodiments, the present invention relates to a method of adhering a plurality of substrates in an aqueous environment, wherein the 3,4-dihydroxystyrene comprise about 1-49% of the copolymer adhesive by molar percentage and wherein the styrene comprise about 51-99% of the copolymer adhesive by molar percentage.

In some preferred embodiments, the present invention relates to a method of adhering a plurality of substrates in an aqueous environment, wherein the 3,4-dihydroxystyrene comprise about 20-30% of the copolymer adhesive by mole percentage and wherein the styrene comprise about 70-80% of the copolymer adhesive by mole percentage.

In some embodiments, the present invention relates to a method of adhering a plurality of substrates in an aqueous environment, wherein the copolymer adhesive is dissolved in a solvent having a density greater than water.

In some embodiments, the present invention relates to a method of adhering a plurality of substrates in an aqueous environment, wherein the solvent used to dissolve said copolymer adhesive is a halogen hydrocarbon.

In some embodiments, the present invention relates to a method of adhering a plurality of substrates in an aqueous environment, wherein the solvent used to dissolve said copolymer adhesive is chloroform.

In some embodiments, the present invention relates to a method of adhering a plurality of substrates in an aqueous environment, wherein at least one of said substrates is wood.

In some embodiments, the present invention relates to a method of adhering a plurality of substrates in an aqueous environment, wherein one of said substrates is a metal.

In some embodiments, the present invention relates to a method of adhering a plurality of substrates in an aqueous environment, wherein metal substrates is aluminum or an alloy thereof.

In some embodiments, the present invention relates to a method of adhering a plurality of substrates in an aqueous environment, wherein one of said substrates is a synthetic polymer.

In some embodiments, the present invention relates to a method of adhering a plurality of substrates in an aqueous environment, wherein one of said substrates is polyetrafluoroethylene.

In some embodiments, the present invention relates to a method of adhering a plurality of substrates in an aqueous environment, wherein the copolymer adhesive has a molecular weight of 100,000 g/mol or less.

Molecular weight can have a major impact upon adhesion, with shorter chains providing surface wetting, yet longer molecules being best at bringing about polymer-polymer interactions for cohesion. Catechol-polystyrenes of several different molecular weights were made here by changing the ratio of n-butyl lithium polymerization initiator to monomers in the reaction feed. The catechol content of these polymers was held between 27% and 33% (Table 1).

TABLE 1

Polymer synthesis and characterization data for a molecular weight study.

| Feed Content | | Final Polymer Content | | | | |
|---|---|---|---|---|---|---|
| 3,4-dimethoxystyren feed (mole %) | styrene feed (mole %) | final 3,4-Dimethoxystyrene content (mole %) | final styrene content (mole %) | $M_n$ (g/mole) | $M_w$ (g/mole) | PDI |
| 41 | 59 | 31 | 69 | 16,000 | 23,000 | 1.4 |
| 41 | 59 | 31 | 69 | 19,000 | 30,000 | 1.6 |
| 41 | 59 | 33 | 67 | 29,000 | 47,000 | 1.6 |
| 40 | 60 | 27 | 73 | 37,000 | 54,000 | 1.5 |
| 40 | 60 | 28 | 72 | 50,000 | 67,000 | 1.3 |
| 42 | 58 | 29 | 71 | 49,000 | 75,000 | 1.5 |
| 40 | 60 | 29 | 71 | 52,000 | 77,000 | 1.5 |
| 45 | 55 | 27 | 73 | 56,000 | 79,000 | 1.4 |
| 40 | 60 | 27 | 73 | 59,000 | 84,000 | 1.4 |
| 40 | 60 | 28 | 72 | 63,000 | 95,000 | 1.5 |
| 30 | 70 | 33 | 67 | 60,000 | 97,000 | 1.6 |

Mn = number average molecular weight;
Mw = weight average molecular weight;
PDI = Polydispersity Index (Mw/ Mn).

Figure 1:
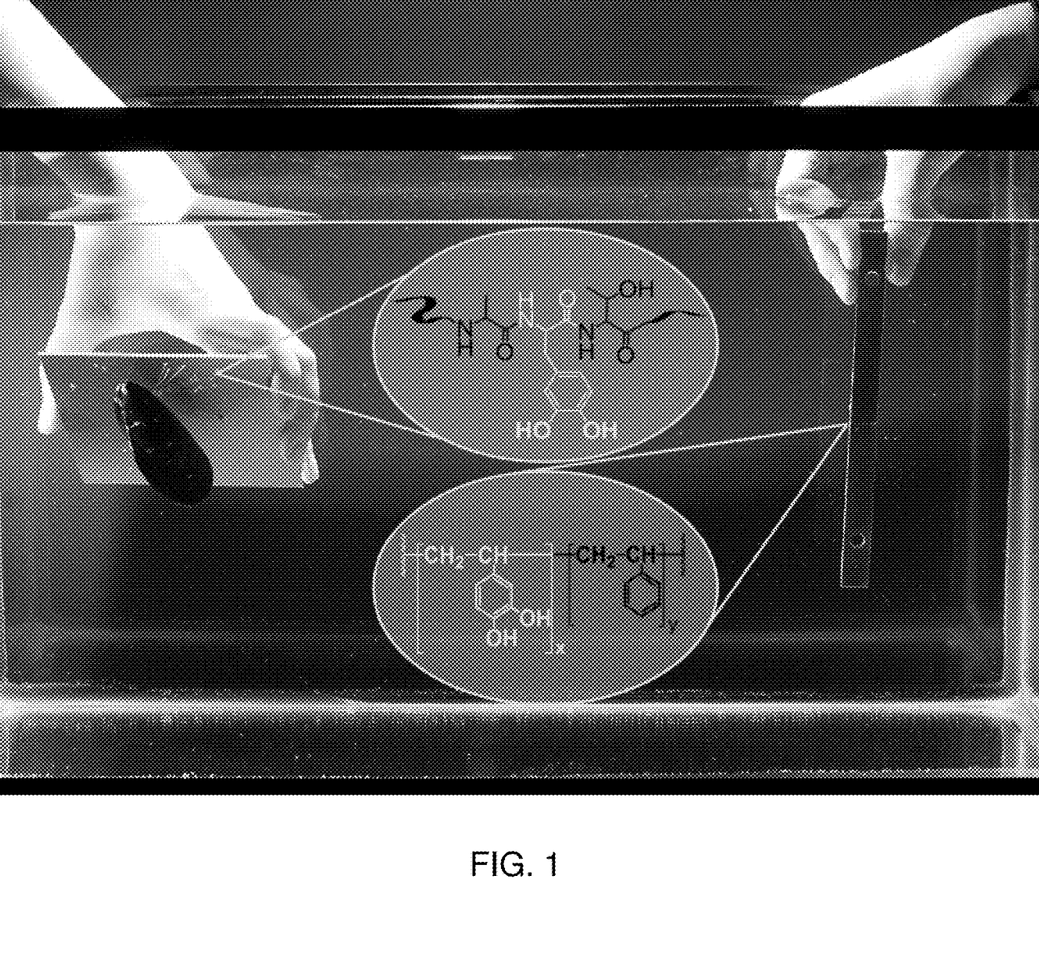
FIG. 1 depicts both mussel and lap shear testing configurations, with relevant chemistry displayed in insets.

To test underwater bonding, polished aluminum substrates were submerged into a tank of artificial sea water (FIG. 1). Catechol-polystyrene was dissolved into chloroform, and syringed onto a substrate. The choice of chloroform was dictated by needing a solvent denser than water such that the adhesive formulation did not float up and off the substrate.

Figure 2A:
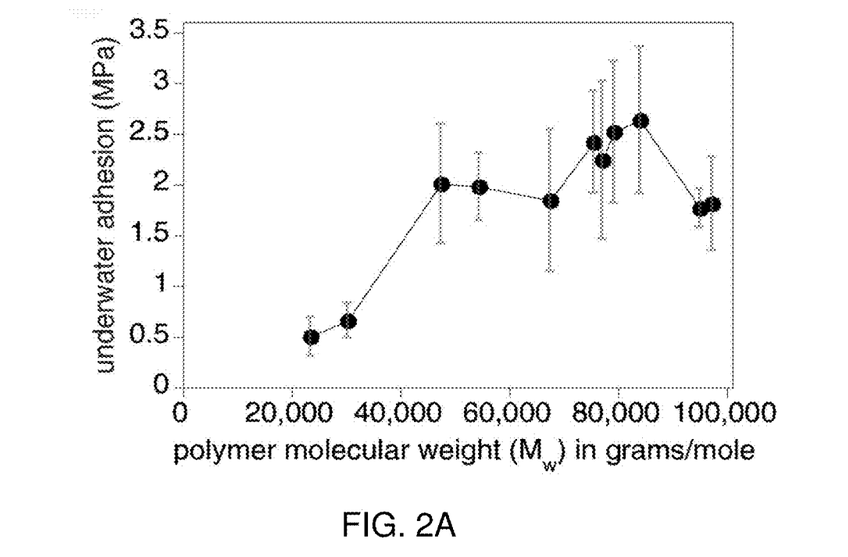
FIG. 2A is a graph depicting underwater adhesion strength of catechol-polystyrene polymer as a function of polymer molecular weight.

A second piece of aluminum was then placed atop the first to create a lap shear joint. After addition of a weight to hold the substrates together and a cure period, the assembly was removed from the tank and pulled apart by a materials testing system to quantify bonding. Maximum force at failure was divided by substrate overlap area to provide adhesion values (in MPa). FIG. 2A shows a strong dependence of adhesion upon polymer molecular weight. Underwater bonding adhesion strength peaks at approximately 85,000 grams/mole. This point is likely where surface adhesive and bulk cohesive forces achieve an optimal balance in an aqueous environment. Analogous data for dry bonding differs, with no obvious peak and increasing molecular weights correlating to higher adhesion even over 100,000 grams/mole (C. L. Jenkins, et al., *ACS Appl. Mater. Interfaces* 2013, 5, 5091-5096).

Figure 2B:
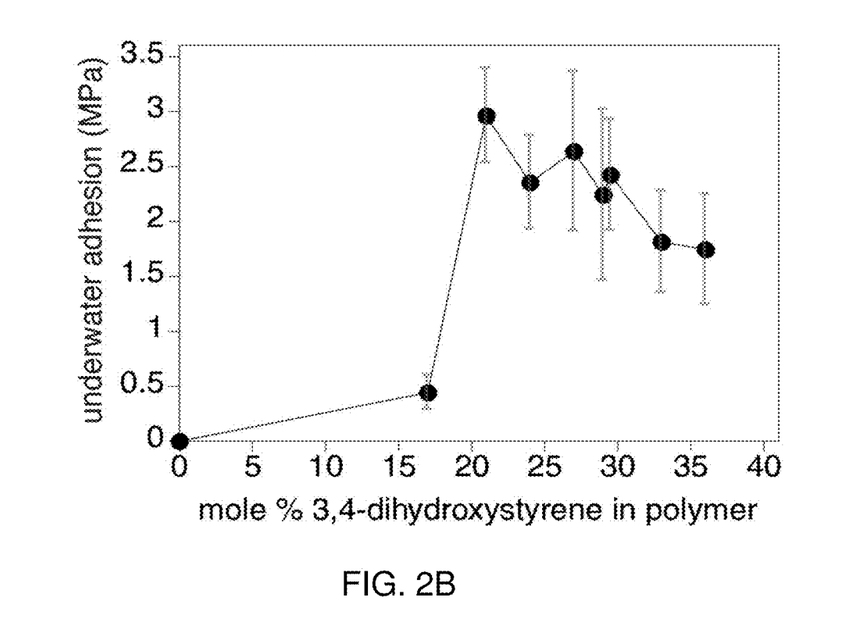
FIG. 2B is a graph depicting underwater adhesion strength of catechol-polystyrene polymer as a function of mole percent 3,4-dihydroxystyrene in the polymer.

The degree of cross-linking can also sway an adhesive-cohesive balance. Oxidized catechols (i.e., semiquinone or quinone) bring about cross-linking to generate cohesive bonds within the material (E. Faure, et al., *Prog. Polym. Sci.* 2013, 38, 236-270). However, it is the reduced form of the DOPA catechol ring that is responsible for surface adhesive contacts. Consequently, the amount of catechol-containing monomers within the polymer will influence overall adhesion. FIG. 2B presents a study in which several catechol-polystyrenes were made, each with differing amounts of the 3,4-diydroxystrene (Table 2). Polymer molecular weights were maintained at ~76,000-101,000 grams/mole in keeping with the results from FIG. 2A for optimal bonding. Maximum underwater adhesion was found with a polymer of ~22% 3,4-dihydroxystyrene monomers and ~78% styrene monomers (FIG. 2B). Here, too, results for underwater bonding differed versus dry conditions, which maximized dry bonding adhesion strength with a polymer of ~33% 3,4-dihydroxystyrene monomers and ~67% styrene monomers (C. R. Matos-Perez, et al., *J. Am. Chem. Soc.* 2012, 134, 9498-9505).

941-944). Neutral catechol-containing polyvinylpyrrolidine applied to wetted glass and then cured underwater was at 1.3 MPa and a polyacrylate on wet glass bonded to 1.6 MPa. Beyond mussel mimicking systems is a "molecular velcro" of a metal complex guest and a macrocycle host, each surface grafted onto silicon, yielding up to 1.1 MPa underwater (Y. Ahn, et al., *Angew. Chem.* 2013, 125, 3222-3226). A light cured bispheonol-acrylate adhered aluminum underwater to 1.2 MPa. Improvements in bulk adhesive performance are typically gradual, with a factor of 2× enhancement being quite significant. With strengths up to ~3 MPa, bulk underwater adhesion with catechol-polystyrene was quite appreciable. For the sake of calibration, analogous dry conditions put commercially available Krazy Glue™ (ethylcyanoacrylate) at ~7 MPa (C. R. Matos-Perez, et al., *J. Am. Chem. Soc.* 2012, 134, 9498-9505).

Figure 3:
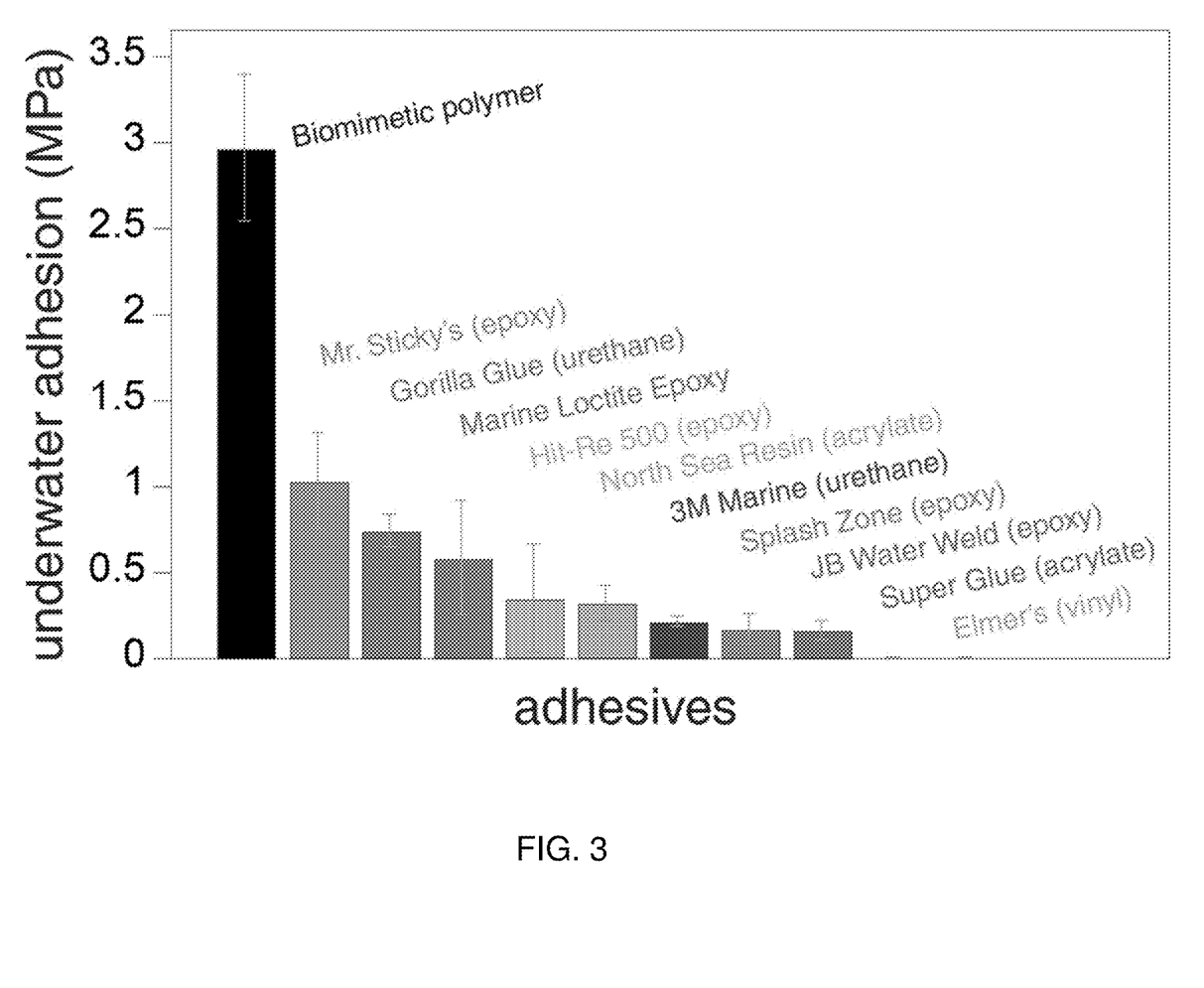
FIG. 3 is a graph depicting comparative underwater adhesion strength of catechol-polystyrene, referred to here as "biomimetic polymer," as compared to commercially available adhesives.

In order to provide direct performance benchmarking, bonding was carried out with a range of commercial glues including common adhesives and specialty materials billed for wet applications. Conditions held constant included quantity of adhesive, cure time, cure temperature, substrate, and being applied underwater. FIG. 3 provides data indicating that catechol-polystyrene outperformed every product tested, usually by quite significant margins. Standard adhesives such as Elmer's Glue-All™ (polyvinyl acetate) and Super Glue™ (ethylcyanoacrylate) failed to bond at even modest levels, likely a result of not being able to cure underwater or the water inducing curing too rapidly to allow interaction with the substrates, respectively. We now have what appears to be the strongest underwater adhesive reported to date.

For providing a broader context of underwater bonding capability, catechol-polystyrene adhesion on a range of different substrates was compared to the five strongest commercial glues from FIG. 3. Table 3 shows that these selected commercial products performed best with polyvinyl chloride, etched aluminum, and sanded steel substrates. On

TABLE 2

Polymer synthesis and characterization data for a polymer composition study.

| Feed Content | | Final Polymer Content | | | | |
|---|---|---|---|---|---|---|
| 3,4-dimethoxystyrene feed (mole %) | styrene feed (mole %) | final 3,4-dimethoxystyren content (mole %) | final styrene content (mole %) | Mn (g/mole) | Mw (g/mole) | PDI |
| n/a | n/a | 0 | 100 | 97,000 | 101,000 | 1.0 |
| 16 | 84 | 17 | 83 | 67,000 | 96,000 | 1.4 |
| 30 | 70 | 21 | 79 | 63,000 | 84,000 | 1.3 |
| 41 | 59 | 24 | 76 | 67,000 | 97,000 | 1.4 |
| 40 | 60 | 27 | 73 | 59,000 | 84,000 | 1.4 |
| 40 | 60 | 29 | 71 | 52,000 | 77,000 | 1.5 |
| 42 | 58 | 30 | 70 | 49,000 | 75,000 | 1.5 |
| 30 | 70 | 33 | 67 | 60,000 | 97,000 | 1.6 |
| 40 | 60 | 36 | 64 | 53,000 | 76,000 | 1.4 |

Making direct comparisons of adhesion data is often difficult, given variations in several parameters including substrate choice, cure conditions, joint type, and testing methods. However, we can gain some context for how catechol-polystyrene compares to prior efforts. Bulk lap shear joints between aluminum substrates with charged catechol-containing polymers have been reported at 0.35 MPa for polyoxetanes and humid conditions with partial drying. When in a coacervate phase of a polyanion condensed with Ca2+ cations, strengths up to 1.2 MPa were found (S. Kaur, et al., *ACS Appl. Mater. Interfaces* 2011, 3, polytetrafluoroethylene (Teflon™), wood (red oak), and polished aluminum, catechol-polystyrene displayed the highest adhesion. With Teflon™, only the biomimetic polymer and a single product provided any bonding at all. For wood, catechol-polystyrene was the single system capable of creating a measurable bond underwater.

A new material that can, at times, outperform established products is quite exciting. Perhaps even more challenging is direct comparison of a biomimetic system against the true biological counterpart. Live mussels were placed atop sheets of polished aluminum for deposition of their adhesive.

Using an established method and several animals, adhesive plaques were pulled up from the surfaces until failure (J. R. Burkett, et al., *J. Adhesion,* 2009, 85, 601-615). Average mussel adhesion in this tensile mode was 0.13±0.01 MPa. For a direct comparison, polished aluminum rods were held under salt water and bonded together into tensile joints using catechol-polystyrene. The rods were then pulled apart to reveal adhesion at 2.2±0.9 MPa. Synthetic systems can mimic nature, but seldom outperform biological materials, thereby rendering these results unexpected.

TABLE 3

Underwater adhesion strength of catechol-polystyrene (biomimetic polymer) benchmarked against commercial glues. Lap shear joints between several substrate types were examined

| Adhesive | Substrates | | | | | |
|---|---|---|---|---|---|---|
| | Polished aluminum | Etched aluminum | Sanded steel | Wood | PVC | Teflon |
| Mr. Sticky's | 1.0 ± 0.3 | 0.2 ± 0.1 | 0.4 ± 0.1 | 0 | 3.0 ± 0.6 | 0.1 ± 0.1 |
| Marine Loctite epoxy | 0.6 ± 0.3 | 0 | 0.2 ± 0.1 | 0 | 2.0 ± 0.5 | 0 |
| 3M Marine sealant | 0.20 ± 0.03 | 0.10 ± 0.02 | 0.2 ± 0.1 | 0 | 1.0 ± 0.3 | 0 |
| North Sea Resin | 0.3 ± 0.1 | 0 | 0.2 ± 0.1 | 0 | 0 | 0 |
| Gorilla Glue | 0.7 ± 0.1 | 0.4 ± 0.2 | 0.5 ± 0.1 | 0 | 3.0 ± 0.6 | 0 |
| Biomimetic Polymer | 3.0 ± 0.4 | 0.2 ± 0.1 | 0.10 ± 0.02 | 0.20 ± 0.02 | 0.4 ± 0.1 | 0.3 ± 0.1 |

Several recent reports have been contributing to our understanding of how mussels bond to rocks so well. Without being bound by theory, catechols may have a special ability to drill down through surface-bound waters for enabling wet attachment. Having two adjacent alcohol groups might allow for cooperative binding, analogous to an entropic "chelate effect" (S. A. Mian et al., *Langmuir,* 2014, 30, 6906-6914). Hydrogen bonding and metal chelation at the substrate appear likely to be contributing surface adhesion. Oxidative cross-linking generates cohesive forces (H. Lee, et al., *Proc. Natl. Acad. Sci.* 2006, 103, 12999-13003). Cationic charges within mussel adhesive proteins have been proposed recently to aid this bonding in salt water. Positively charged amino acids could help outcompete surface-bound cations such as sodium, thereby allowing proteins to gain access onto mildly anionic surfaces including rocks. In order to address potential roles for charges and salts, we examined the bonding of poly[(3,4-dhydroxystyrene) 28%-co-(styrene) 72%] (Mw=95,000 grams/mole) in deionized water (pH=7.9) and found a value of 0.4±0.1 MPa. When the same experiment was carried out under artificial sea water (pH=7.9), adhesion was at 1.8±0.2 MPa. Note that catechol-polystyrene is a neutral polymer and we might expect improved adhesion under deionized versus salt water. This unexpected finding could be a function of the current study using a bulk, macroscopic adhesion method versus prior efforts examining interactions on the nanometer scale (G. P. Maier, et al., *Science* 2015, 349, 628-632). Nonetheless, such data indicate that disruption of charges atop submerged surfaces may not be of primary importance for adhesion in the seas.

Results presented here show that man-made materials can, indeed, bring about quite significant underwater adhesion. Biomimetic principles are useful for developing materials that outperform commercial products and even, surprisingly, a reference biological system. Throughout these efforts, shellfish, the true masters of wet bonding, continue to reveal the secrets of adhesion.

Polymer Synthesis

The poly[(3,4-dimethoxystyrene)-co-(styrene)] precursor copolymers were synthesized using a prior method (C. R. Matos-Perez, et al., *J. Am. Chem. Soc.* 2012, 134, 9498-9505). Briefly, styrene, 3,4-dimethoxystyrene and toluene were combined in a flame-dried Schlenk flask. The flask was then cooled in a dry ice/isopropanol bath. After 10 minutes, n-butyl lithium was added to initiate polymerization. The reaction mixture was kept on dry ice for 8 hours and then allowed to warm up to room temperature gradually. After 24 hours of total time, the reaction was quenched and the polymer precipitated by addition of methanol. The polymer was redissolved into chloroform and then reprecipitated with methanol. This purification procedure was repeated three times. The polymer was dried via rotary evaporator and placed under vacuum overnight.

Polymer Deprotection

Poly[(3,4-dimethoxystyrene)-co-(styrene)] was converted to poly[(3,4-dihydroxystyrene)-co-(styrene)] by dissolving the former into dichloromethane in a flame-dried Schlenk flask. The flask was placed into an ice bath for 10 minutes after which BBr3 was added. This reaction proceeded overnight, was quenched with methanol, and allowed to stir for 15 minutes. The mixture was then poured into 1% hydrochloric acid and stirred for 15 minutes. After being allowed to settle, the excess hydrochloric acid was decanted. This procedure was repeated 3 times. The solid was then dissolved in dichloromethane and acetone then dried via rotary evaporator. The final white solid was placed under vacuum overnight.

Polymer Characterization

Polymers were characterized primarily with proton nuclear magnetic resonance (1H NMR) spectroscopy and gel permeation chromatography (GPC). The 1H NMR spectra were recorded on a Varian Inova-300 MHz spectrometer and provided compositions. Gel permeation chromatography was performed in THF mobile phase on a Polymer Laboratories PLC-GPC20 to yield molecular weights (Mn and Mw) and polydispersity indices (PDI's).

Water Preparation

Artificial seawater was prepared using Marine Environment dual phase formula and reverse osmosis water to a final salinity of 35 grams/liter. Deionized water was prepared using a Barnstead Nanopure Infinity Ultrapure water system with a final resistivity of 18 MΩ-cm. All water was prepared immediately prior to use. Deionized water was at pH=8.0 directly from the purifier and at pH 7.9 after 24 hours. The salt water was pH=7.9 at both the beginning and end of the 24 hour experiment periods.

Lap Shear Adhesion Testing

Lap shear adhesive bonding was carried out with a modified version of the ASTM D1002 standard method. Derivatives of poly[(3,4-dihydroxystyrene)-co-(styrene)] were dissolved at 0.3 g/mL in chloroform with 45 µL dispensed onto each completely submerged adherend. An additional 15 µL of chloroform was then deposited. Another adherend was placed on top of the first to form overlap joints of 1.2 cm×1.2 cm. The bonds were cured at room temperature for 24 hours, completely submerged prior to being removed and tested immediately on an Instron 5544 materials testing system. Measurements used a 2,000 N load cell and a crosshead speed of 2 mm/min. The maximum force at joint failure divided by the overlap area provided the adhesion strength. Each sample was tested a minimum of 5 times and averaged. The molecular weight and catechol percent graphs of FIGS. 2A and 2B show averages of 10 samples. Error bars indicate 90% confidence intervals.

Preparation of Substrates

Substrates were prepared using methods known in the art. Briefly, aluminum, type 6061 T6, was purchased and prepared either by mirror polishing with Mibro no. 3 and Mibro no 5. polish or an ASTM D2651-01 method for adherend cleaning. Red oak was purchased locally and had a surface roughness equivalent to that of 220 grit sandpaper. Steel adherends were sanded with 50 grit sandpaper prior to testing and then washed with ethanol, acetone, and hexanes. PVC and PTFE were obtained from Rideout Plastics.

Testing of Commercial Adhesives

Eleven different commercial glues were tested underwater using similar conditions to poly[(3,4-dihydroxystyrene)-co-(styrene)]. Each product was measured 5 times using a mass of 13.5 mg to match the mass of poly[(3,4-dihydroxystyrene)-co-(styrene)] in each trial (0.3 g/mL and 45 µL). Drying experiments noted no significant loss of mass or solvent from any of the commercial glues. Samples were cured for 24 hours while underwater and then tested immediately.

Animal Handling

Blue mussels (*Mytilus edulis*) were maintained in an aquarium system as known in the art, with growth conditions of 4° C., 35 grams/liter salinity, and constant aeration. Each mussel was held in place with a rubber band on one 10×10 cm polished aluminum panel. The adhesive plaques of nine adult mussels were examined, maintained in a 350 gallon aquarium.

Live Mussel Adhesion Data Collection

Removal force was collected on an Instron 5544 materials testing system. Adhesion testing was carried out three days after placement of mussels and panels into the aquarium. Three separate trials were conducted whereby a total of 9 animals were examined to yield 48 plaques. Adhesion measurements were all averaged per animal. These average values per animal were then averaged to get an overall mean adhesion measurement. This method minimizes the effect of one shellfish biasing data too much by providing a different number of plaques as well as particularly weak or strong bonding.

Tensile Adhesion Testing of Polymers

Polished aluminum rods of 1.5 cm diameter were completely submerged underwater. Poly[(3,4-dihydroxystyrene)-co-(styrene)], 45 µL, was applied to one adherend and overlapped with the second rod. These joint assemblies cured for 3 days underwater in order to mimic conditions of the live mussel testing. Ten samples were measured and averaged.

Reference systems, if used herein, refer generally to various directions (for example, top, bottom, upper, lower, forward, rearward, left, right, etc.), which are merely offered to assist the reader in understanding the various embodiments of the disclosure and are not to be interpreted as limiting. Other reference systems may be used to describe various embodiments.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

Appended hereto, beginning on the following page, are one or more representative claims. Since the present application is a provisional application, no claims are required. Thus, by presenting the following representative claims, it is the applicants' intention that the representative claims be considered part of the disclosure of the invention only, and not a limitation, with respect to the range of equivalents or scope, or any claims that might ultimately issue in any application claiming priority to this provisional application.

What is claimed is:

1. A method of adhering a plurality of substrates in an aqueous environment prior or during adhering, comprising the steps of:
   a. selecting at least two substrates to be adhered; and
   b. adhering the substrates in an aqueous environment using a copolymer adhesive consisting of a neutral copolymer prepared from polymerization of a dihydroxstyrene and an unsubstituted styrene, wherein said copolymer has a molecular weight in the range of from about 76,000 Da to about 100,000 Da, and a solvent having a density higher than that of water.

2. The method of claim 1, wherein the dihydroxstyrene comprises about 1~49% of the copolymer adhesive by molar percentage.

3. The method of claim 1, wherein the dihydroxstyrene comprises about 20~30% of the copolymer adhesive by molar percentage.

4. The method of claim 1, wherein the unsubstituted styrene comprises about 51~99% of the copolymer adhesive by molar percentage.

5. The method of claim 1, wherein the unsubstituted styrene comprises more than 75% of the copolymer adhesive by molar percentage.

6. The method of claim 1, wherein the aqueous environment is a salt water or fresh water environment.

7. The method of claim 1, wherein the copolymer adhesive comprises poly[(3,4-dihydroxystyrene)-co-styrene].

8. The method of claim 7, wherein the 3,4-dihydroxystyrene comprise about 1~49% of the copolymer adhesive by molar percentage and wherein the styrene comprise about 51~99% of the copolymer adhesive by molar percentage.

9. The method of claim 7, wherein the 3,4-dihydroxystyrene comprise about 20~30% of the copolymer adhesive by mole percentage and wherein the styrene comprise about 70~80% of the copolymer adhesive by mole percentage.

10. The method of claim 1, wherein the copolymer adhesive is dissolved in a solvent having a density greater than water.

11. The method of claim 10, wherein the solvent is a halogen hydrocarbon.

12. The method of claim 11, wherein the halogen hydrocarbon is chloroform.

13. The method of claim 1, wherein at least one of said substrates is wood.

14. The method of claim 1, wherein one of said substrates is a metal or an alloy thereof.

15. The method of claim 1, wherein one of said substrates is a synthetic polymer.

16. The method of claim 15, wherein said synthetic polymer is polytetrafluoroethylene.

17. The method of claim 1, wherein the copolymer adhesive has a molecular weight of 100,000 g/mol or less.

18. An adhesive for binding substrates in an aqueous environment consisting of a copolymer of a dihydroxstyrene and an unsubstituted styrene, wherein said copolymer has a molecular weight of about 100,000 g/mol or less, and a solvent having a density greater than that of water.

19. The adhesive according to claim 18, wherein said solvent is a halogen hydrocarbon.

* * * * *